United States Patent
Meier et al.

(10) Patent No.: US 10,202,472 B1
(45) Date of Patent: Feb. 12, 2019

(54) OLEFIN POLYMERIZATION PROCESS

(71) Applicant: Basell Polyolefine GmbH, Wesseling (DE)

(72) Inventors: Gerhardus Meier, Frankfurt am Main (DE); Ulf Schueller, Weiterstadt (DE); Claudio Fibla, Koenigstein/Ts. (DE); Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 16/079,229

(22) PCT Filed: Feb. 23, 2017

(86) PCT No.: PCT/EP2017/054109
§ 371 (c)(1),
(2) Date: Aug. 23, 2018

(87) PCT Pub. No.: WO2017/144559
PCT Pub. Date: Aug. 31, 2017

(30) Foreign Application Priority Data

Feb. 23, 2016 (EP) .................................. 16156846

(51) Int. Cl.
| C08F 10/02 | (2006.01) |
| C08F 210/16 | (2006.01) |
| C08F 4/22 | (2006.01) |
| C08F 2/34 | (2006.01) |
| C08F 2/38 | (2006.01) |
| C08F 2/44 | (2006.01) |
| C08F 2/02 | (2006.01) |

(52) U.S. Cl.
CPC .................................. C08F 10/02 (2013.01)

(58) Field of Classification Search
CPC .. C08F 210/16; C08F 2/34; C08F 4/22; C08F 2/02; C08F 10/02; C08F 2/38; C08F 2/44
USPC ..................................................... 526/64, 90
See application file for complete search history.

(56) References Cited

U.S. PATENT DOCUMENTS

| 4,101,289 A | 7/1978 | Jezl et al. |
| 6,413,477 B1 | 7/2002 | Govoni et al. |
| 6,818,187 B2 | 11/2004 | Govoni et al. |
| 6,891,001 B2 | 5/2005 | Kuhlburger |
| 6,936,666 B2 | 8/2005 | Mihan et al. |
| 7,625,987 B2 | 12/2009 | Parrish et al. |
| 8,148,478 B2 | 4/2012 | Rinaldi et al. |
| 9,938,370 B2 | 4/2018 | Cannas et al. |
| 2010/0247250 A1 | 9/2010 | Michielin et al. |
| 2011/0009577 A1* | 1/2011 | Jorgensen ............... C08F 10/00 526/105 |
| 2016/0130376 A1 | 5/2016 | Mihan et al. |
| 2018/0079842 A1 | 3/2018 | Fraaije et al. |

FOREIGN PATENT DOCUMENTS

| EP | 2155374 A1 | 2/2010 |
| EP | 2813520 A1 | 12/2014 |
| EP | 2813529 A1 | 12/2014 |
| JP | 2007-500279 A | 1/2007 |
| KR | 20160012202 A | 2/2016 |
| RU | 2461418 C2 | 9/2012 |
| RU | 2485138 C2 | 6/2013 |
| WO | 97/04015 A1 | 2/1997 |
| WO | 9912982 A1 | 3/1999 |
| WO | 0002929 A1 | 1/2000 |
| WO | 0177191 A1 | 10/2001 |
| WO | 2003042253 A1 | 5/2003 |
| WO | 2011006111 A1 | 1/2011 |
| WO | 2016150996 A1 | 9/2016 |

OTHER PUBLICATIONS

The International Search Report and Written Opinion for PCT/EP2017/054109 dated Jun. 7, 2017.

* cited by examiner

Primary Examiner — William K Cheung

(57) ABSTRACT

A process for the preparation of an ethylene polymer including the step of polymerizing ethylene or copolymerizing ethylene and one or more other olefins in the presence of a Phillips-type chromium catalyst in a gas-phase polymerization reactor containing a reactor bed of particulate polymer, wherein the gas-phase polymerization reactor is equipped with a cycle gas line, wherein the reactor gas returned to the polymerization reactor through the cycle gas line has been condensed in part and the amount of liquid in the returned reactor gas is from 0.5 wt. % to 10 wt. % based upon the total weight of the reactor gas/liquid composition, the polymerization is carried out at from 108° C. to 125° C., and an aluminum alkyl is fed into the polymerization reactor in an amount in the range of from 0.0025 mole to 0.1 mole per ton of dosed ethylene.

20 Claims, No Drawings

US 10,202,472 B1

OLEFIN POLYMERIZATION PROCESS

This application is the U.S. National Phase of PCT International Application PCT/EP2017/054109, filed Feb. 23, 2017, claiming benefit of priority to European Patent Application No. 16156846.4, filed Feb. 23, 2016, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a process for the preparation of an ethylene polymer including polymerizing ethylene or copolymerizing ethylene and one or more other olefins in the presence of a Phillips-type chromium catalyst in a gas-phase polymerization reactor.

BACKGROUND OF THE INVENTION

Phillips-type chromium catalysts are used for producing polyethylenes with a broad molecular weight distribution and a low level of long chain branching. In some instances, gas phase polymerizations are operated in condensed mode for ethylene polymerization processes utilizing Ziegler-Natta or metallocene catalysts. In some instances, there have been challenges using chromium-based catalysts in gas phase polymerizations operated in condensed mode.

SUMMARY OF THE INVENTION

In a general embodiment, the present disclosure provides a process for the preparation of an ethylene polymer including the step of polymerizing ethylene or copolymerizing ethylene and one or more other olefins in the presence of a Phillips-type chromium catalyst in a gas-phase polymerization reactor containing a reactor bed of particulate polymer, wherein the gas-phase polymerization reactor is equipped with a cycle gas line for (a) withdrawing reactor gas from the reactor, (b) leading the reactor gas through a heat-exchanger for cooling, and (c) feeding the reactor gas back to the reactor, wherein (i) the reactor gas returned to the polymerization reactor through the cycle gas line has been condensed in part, (ii) the amount of liquid in the reactor gas returned to the polymerization reactor is from 0.5 wt. % to 10 wt. % based upon the total weight of the reactor gas/liquid composition, (iii) the polymerization is carried out at a temperature from 108° C. to 125° C., and (iv) an aluminum alkyl of formula $AlR_3$ or of formula $AlR_nR'_m$, in which R is a $C_4$-$C_{12}$-alkyl, R' is a $C_4$-$C_{24}$-alkanediyl group which is bridging two aluminum atoms, and n+m=3, is fed into the polymerization reactor in an amount in the range of from 0.0025 mole to 0.1 mole per ton of dosed ethylene.

In some embodiments, the ethylene polymerization is an ethylene copolymerization of ethylene and 1-butene or an ethylene copolymerization of ethylene and 1-hexene.

In some embodiments, the aluminum alkyl is trihexylaluminum.

In some embodiments, the aluminum alkyl is fed to the reactor bed or to the cycle gas line.

In some embodiments, the polymerization is carried out in the presence of an antistatic agent.

In some embodiments, the antistatic agent is a mixture made from or containing an oil-soluble surfactant, water, optionally an alcohol, and one or more aliphatic hydrocarbons.

In some embodiments, first a mixture of the oil-soluble surfactant, the water, optionally the alcohol, and one or more aliphatic hydrocarbons is prepared and then the mixture is introduced into the polymerization reactor.

In some embodiments, the reactor gas is made from or contains one or more C4-C6 alkanes.

In some embodiments, the content of $C_4$-$C_6$ alkanes in the reactor gas is from 1 vol. % to 10 vol. % based upon the total volume of the reactor gas.

In some embodiments, the Phillips-type chromium catalyst has been activated at a temperature of from 350° C. to 1000° C.

In some embodiments, the ethylene polymer has a density determined according to DIN EN ISO 1183-1:2004, Method A at 23° C. of from 0.918 g/cm3 to 0.970 g/cm3.

In some embodiments, the ethylene polymer has a melt flow rate MFR21 determined according to DIN EN ISO 1133:2005 at a temperature of 190° C. under a load of 21.6 kg from 0.1 g/10 min to 100 g/10 min.

DETAILED DESCRIPTION OF THE INVENTION

In a general embodiment, the present disclosure provides a process for the preparation of an ethylene polymer including the step of polymerizing ethylene or copolymerizing ethylene and one or more other olefins in the presence of a Phillips-type chromium catalyst. In some embodiments, olefins for being copolymerized with ethylene are 1-olefins. As used herein, the term "1-olefins" refers to hydrocarbons having terminal double bonds. In some embodiments, the olefins are functionalized olefinically unsaturated compounds. In some embodiments, the olefins are linear or branched $C_3$-$C_{12}$-1-alkenes, or conjugated and nonconjugated dienes. In some embodiments, the olefins are linear $C_3$-$C_{10}$-1-alkenes selected from the group consisting of propylene, 1-butene, 1-pentene, 1-hexene, 1-heptene, 1-octene, and 1-decene. In some embodiments, the olefin is the branched $C_2$-$C_{10}$-1-alkene of 4-methyl-1-pentene. In some embodiments, the olefins are dienes selected from the group consisting of 1,3-butadiene, 1,4-hexadiene and 1,7-octadiene. In some embodiments, the olefins have the double bond as part of a cyclic structure with one or more ring systems. In some embodiments, the cyclic olefins are selected from the group consisting of cyclopentene, norbornene, tetracyclododecene, methylnorbornene, 5-ethylidene-2-norbornene, norbornadiene, and ethylnorbornadiene. In some embodiments, the olefins are mixtures of two or more olefins.

In some embodiments, comonomers are present in an amount up to 20 wt. % based upon the total weight of the copolymer, alternatively from 0.01 wt. % to 15 wt. %, alternatively from 0.05 wt. % to 12 wt. %. In some embodiments, the comonomers are $C_3$-$C_8$-1-alkenes. In some embodiments, the $C_3$-$C_8$-1-alkenes are selected from the group consisting of 1-butene, 1-pentene, 1-hexene, and 1-octene. In some embodiments, ethylene is copolymerized with from 0.1 wt. % to 12 wt. % based upon the total weight of the copolymer, of 1-hexene, 1-butene, or both.

In some embodiments, the Phillips-type chromium catalyst is prepared by applying a chromium compound to an inorganic support and subsequently activating the obtained catalyst precursor at temperatures in the range from 350 to 1000° C., resulting in chromium present in valences lower than six being converted into the hexavalent state. In some embodiments and apart from chromium, further elements are used. In some embodiments, those elements are selected from the group consisting of magnesium, calcium, boron, aluminum, phosphorus, titanium, vanadium, zirconium and zinc. In some embodiments, those elements are selected from the group consisting of titanium, zirconium and zinc. In some embodiments, combinations of the elements are used. In some embodiments, the catalyst precursor is doped with fluoride prior to or during activation. In some embodiments, supports for the Phillips-type catalysts are made of compounds selected from the group consisting of aluminum oxide, silicon dioxide (silica gel), titanium dioxide, zirconium dioxide and their mixed oxides or cogels, and aluminum phosphate. In some embodiments, the support materials are obtained by modifying the pore surface area. In some embodiments, the materials are selected from the group consisting of compounds of the elements boron, aluminum, silicon or phosphorus. In some embodiments, the support is a silica gel. In some embodiments, the supports are spherical or granular silica gels, with the former also being able to be spray dried. In some embodiments, the activated chromium catalysts are subsequently prepolymerized or prereduced. In some embodiments, the prereduction is carried out by cobalt or hydrogen at 250° C. to 500° C., alternatively at 300° C. to 400° C., in an activator.

The process is carried out as gas-phase polymerization. The solid polymers are obtained from a gas-phase of the monomer or the monomers in a gas-phase polymerization reactor containing a reactor bed of particulate polymer. The gas-phase polymerization reactor is equipped with at least one cycle gas line for withdrawing reactor gas from the reactor, leading the reactor gas through a heat-exchanger for cooling and feeding the reactor gas back to the reactor. In some embodiments, the reactors are selected from the group consisting of stirred gas-phase reactors, multizone circulating gas-phase reactors, and fluidized-bed gas-phase reactors.

In some embodiments, the reactor is a stirred gas-phase reactor, in which the reaction bed of polymer particles is kept in motion by a stirrer, and which is either horizontally or vertically stirred. In some embodiments, the cooling of the polymerization occurs by withdrawing reactor gas from the reactor, leading the reactor gas through a heat-exchanger and feeding the reactor gas back to the reactor.

Multizone circulating reactors are gas-phase reactors in which two polymerization zones are linked to one another and the polymer is passed alternately a plurality of times through these two zones. In some embodiments, the reactors are as described in Patent Cooperation Treaty Publication Nos. WO 97/04015 A1 and WO 00/02929 A1, both incorporated herein by reference and have two interconnected polymerization zones, a riser, in which the growing polymer particles flow upward under fast fluidization or transport conditions and a downcomer, in which the growing polymer particles flow in a densified form under the action of gravity. The polymer particles leaving the riser enter the downcomer and the polymer particles leaving the downcomer are reintroduced into the riser, thereby establishing a circulation of polymer between the two polymerization zones and the polymer is passed alternately a plurality of times through these two zones. In some embodiments, the two polymerization zones of one multizone circulating reactor are operated with different polymerization conditions by establishing different polymerization conditions in its riser and its downcomer. In some embodiments, the gas mixture leaving the riser and entraining the polymer particles is partially or totally prevented from entering the downcomer. In some embodiments, a barrier fluid is fed in form of a gas or a liquid mixture into the downcomer. In some embodiments, the feeding occurs in the upper part of the downcomer. In some embodiments, the barrier fluid has a composition, different from that of the gas mixture present in the riser. In some embodiments, the amount of added barrier fluid is adjusted in a way that an upward flow of gas countercurrent to the flow of the polymer particles is generated, thereby acting as a barrier to the gas mixture entrained among the particles coming from the riser. In some embodiments, the countercurrent occurred at the top thereof. In some embodiments, two different gas composition zones occurred in one multizone circulating reactor. In some embodiments, makeup monomers, comonomers, molecular weight regulator or inert fluids are introduced at any point of the downcomer. In some embodiments, the molecular weight regulator is hydrogen. In some embodiments, the point of introduction is below the barrier feeding point. In some embodiments, varying monomer, comonomer and hydrogen concentrations along the downcomer are used to differentiate the polymerization conditions. In some embodiments, cooling of the polymerization occurs by withdrawing reactor gas leaving the riser, leading the reactor gas through a heat-exchanger and feeding the cooled reactor gas back to the reactor at a position before the riser for fast-fluidizing the polymer particles in the riser.

In some embodiments, the process is carried out in a fluidized-bed gas-phase reactor. Fluidized-bed polymerization reactors are reactors in which the polymerization takes place in a bed of polymer particles which is maintained in a fluidized state by feeding in gas at the lower end of the reactor and taking off the gas again at the upper end of the reactor. The reactor gas is then returned to the lower end to the reactor via a cycle gas line equipped with a compressor and a heat exchanger. In some embodiments, the gas is originally fed below a gas distribution grid having the function of dispensing the gas flow.

The velocity of the reactor gas within the fluidized-bed reactor has is high enough to fluidize the bed of particulate polymer present in the tube serving as polymerization zone and remove the heat of polymerization. In some embodiments, the velocity of the reactor gas velocity is specified as superficial velocity.

In some embodiments and for removing entrained polymer particles from the reactor gas withdrawn from the reactor, the cycle gas line is equipped with a cyclone. In some embodiments, the cyclone is located in the cycle gas line upstream of the heat-exchanger for cooling the cycle gas. In some embodiments, a catalyst poison having a boiling point above the maximum temperature within the cycle gas line is fed into the cycle gas line at a position between the reactor and the cyclone to prevent polymer deposits in the cycle gas line as disclosed in Patent Cooperation Treaty Publication No. WO 2003/042253 A1. In some embodiments, catalyst poisons are selected from the group consisting of compounds or mixtures of compounds containing at least one of the functional groups —NR$_2$, —NR—, —OR, —O—, =O, —OS, —S— and =S, where R is hydrogen or an alkyl radical having from 1 to 8 carbon atoms. In some embodiments, the compounds bear a plurality of such functional groups, with these groups being able to be identical or different. In some embodiments, the catalyst poisons contain a hydroxyethylamino group. In some embodiments, the catalyst poisons contain a di(hydroxyethyl)amino group. In some embodiments, the catalyst poison is synthetic ethoxylated amine Atmer 163 (marketed by Croda GmbH, Nettetal, Germany).

In some embodiments, the circulated reactor gas is a mixture of the olefins to be polymerized and inert gases such as nitrogen and/or lower alkanes. In some embodiments, the process is conducted in the presence of nitrogen or a $C_2$-$C_5$ alkane as inert gas. In some embodiments, the process is conducted in the presence of nitrogen or propane. In some embodiments, the circulated reactor gas further includes a $C_4$-$C_6$ alkane. In some embodiments, the $C_4$-$C_6$ alkane is selected from the group consisting of isobutane, cyclobutane isopentane, neopentane, n-hexane and iso-hexane. In some embodiments, the content of $C_4$-$C_6$ alkanes in the reactor gas is from 1 vol. % to 10 vol. %, based upon the total volume of the reactor gas.

In some embodiments, hydrogen is added to the polymerization reactor. In some embodiments, hydrogen is added in an amount such that the content of hydrogen in the reactor gas composition is from 1 vol. % to 10 vol. %, based upon the total volume of the reactor gas.

In some embodiments, oxygen is added to the polymerization reactor. In some embodiments, oxygen is added in an amount such that the content of oxygen in the reactor gas composition is from 0.1 ppm by volume to 0.5 ppm by volume based upon the total volume of the reactor gas.

The cooling of the reactor gas in the heat-exchanger located in the cycle gas line is carried out such that the reactor gas is partly condensed by cooling below the dew point and the amount of liquid in the reactor gas returned to the polymerization reactor is from 0.5 wt. % to 10 wt. %, based upon the total weight of the reactor gas, alternatively from 1 wt. % to 8 wt. %, alternatively from 2 wt. % to 6 wt. %. In some embodiments, the liquefied part of the reactor gas is returned to the reactor together with the remaining gas as a two-phase mixture. In some embodiments, the liquid and the gaseous phase are separated and returned separately to the reactor.

In some embodiments, the polymerization is carried out at a temperature from 108° C. to 125° C., alternatively from 110° C. to 120° C., alternatively from 108° C. to 116° C.

In some embodiments, the polymerization pressure is from 0.1 MPa to 20 MPa, alternatively from 0.5 MPa to 10 MPa, alternatively from 1.0 MPa to 5 MPa.

In some embodiments, the polymerization is carried out in the presence of an aluminum alkyl of formula $AlR_3$ or of formula in which R is, independently of each other, a $C_4$-$C_{12}$-alkyl, R' is, independently of each other, a $C_4$-$C_{24}$-alkanediyl group which is bridging two aluminum atoms, and n+m=3. In some embodiments, R is $C_6$-$C_{10}$-alkyl. In some embodiments, aluminum alkyls of formula $AlR_3$ are selected from the group consisting of tri-isobutylaluminum, tri-n-hexylaluminum, tri-n-octylaluminum, tri-n-decylaluminum, and tridodecylaluminum. In some embodiments, the aluminumalkyl of formula $AlR_nR'_m$ is isoprenylaluminum which has the formula $(i-C_4H_9)_mAl(C_5H_{10})_n$ with n/m≥3.5. In some embodiments, the aluminum alkyls are selected from the group consisting of tri-isobutylaluminum, tri-n-hexylaluminum, and tri-n-octylaluminum. In some embodiments, the aluminum alkyl is tri-n-hexylaluminum In some embodiments, the aluminum alkyl composition is a mixture of aluminum alkyls.

In some embodiments, the aluminum alkyl is fed to the polymerization reactor. In some embodiments, the aluminum alkyl is fed as solution. In some embodiments, the aluminum alkyl is fed as solution in a hydrocarbon solvent or a mineral oil. In some embodiments, the hydrocarbon solvent is n-hexane or iso-hexane. In some embodiments, the concentration of aluminum alkyl in a solution is from 0.5 wt. % to 5 wt. % based upon the total weight of the solution, alternatively from 1 wt. % to 3 wt. %.

In some embodiments, the aluminum alkyl is fed into the polymerization reactor in an amount in the range of from 0.0025 to 0.1 mole per ton of ethylene dosed into the polymerization reactor. In some embodiments, the amount of aluminum alkyl fed into the polymerization reactor is from 0.005 to 0.05 mole per ton of dosed ethylene, alternatively from 0.01 to 0.04 mole per ton of dosed ethylene.

In some embodiments, the aluminum alkyl is fed to polymerization process by introducing the aluminum alkyl into the polymerization reactor at any point of the reactor. In some embodiments, the aluminum alkyl is introduced into the polymerization reactor at the reactor bed or the aluminum alkyl is introduced into the cycle gas line.

In some embodiments, the gas-phase polymerization reactor is a single polymerization reactor. In some embodiments, the gas-phase polymerization reactor is part of a reactor cascade of two or more polymerization reactors. In some embodiments, the polymerization reactors of the cascade are gas-phase reactors. In some embodiments, the reactor cascade is a series of two fluidized-bed reactors or a reactor cascade including a fluidized-bed reactor and a multizone circulating reactor. In some embodiments, the fluidized-bed reactor is arranged upstream of the multizone circulating reactor. In some embodiments, a reactor cascade of gas-phase reactors includes additional polymerization reactors. In some embodiments, the reactors of the reactor cascade are low-pressure polymerization reactors. In some embodiments, the low-pressure polymerization reactors are suspension reactors. In some embodiments, the reactors of the reactor cascade include a pre-polymerization stage.

In some embodiments, the process is carried out in the presence of an antistatic agent.

In some embodiments, the antistatic agent is a mixture made from or containing an oil-soluble surfactant, water, and optionally an alcohol. In some embodiments and utilizing such mixtures, first a mixture of the oil-soluble surfactant, the water, optionally the alcohol, and one or more aliphatic hydrocarbons is prepared and then the mixture is introduced into the polymerization reactor. In some embodiments, the mixtures are made from or contain from 10 to 69.9 wt.-% of oil-soluble surfactant, from 0.1 to 2 wt.-% of water, from 0 to 15 wt.-% of alcohol and from 30 to 89.9 wt.-% of aliphatic hydrocarbon, based upon the total weight of the mixtures. In some embodiments, the mixtures are made from or contain from 20 to 50 wt.-% of oil-soluble surfactant, from 0.2 to 1 wt.-% of water, from 2 to 10 wt.-% of alcohol and from 40 to 77.8 wt.-% of aliphatic hydrocarbon, based upon the total weight of the mixtures. In some embodiments, the oil-soluble surfactant is an ionic oil-soluble surfactant. In some embodiments, the oil-soluble surfactant is a strong organic acid made from or containing a hydrocarbyl group of from 6 to 40 carbon atoms. In some embodiments, the organic acids are organic sulfonic acids, organic sulfinic acids or organic phosphonic acids. In some embodiments, the organic acid is a sulfonic acid. In some embodiments, the oil-soluble surfactants are selected from the group consisting of dinonylnaphthylsulfonic acids and dodecylbenzenesulfonic acids. In some embodiments, the alcohols are linear or branched $C_1$-$C_{12}$ alcohols. In some embodiments, the alcohols are mono alcohols, diols or triols. In some embodiments, the alcohols are mono alcohols having from 1 to 4 carbon atoms. In some embodiments, the alcohol is methanol, ethanol or isopropanol. In some embodiments, hydrocarbons for a preparing the antistatic mixtures are propane, isobutane, n-hexane, isohexane, EXXOL® grades obtainable from ExxonMobil Chemical or white mineral oils. In some embodiments, the amount of oil-soluble surfactant introduced into the polymerization reactor is from 0.025 to 50 ppm per weight referring to the weight of the prepared ethylene polymer. In some embodiments, the amount of water introduced into the polymerization reactor is from 0.005 to 0.5 ppm per weight referring to the weight of the prepared ethylene polymer. In some embodiments, the amount of alcohol introduced into the polymerization reactor is from 0.05 ppm to 5 ppm per weight referring to the weight of the prepared polyolefin. In some embodiments, the antistatic agents are as described in Patent Cooperation Treaty Publication No. WO 2014/198693 A1, incorporated herein by reference.

In some embodiments, the residence time of the mixture of reactants including gaseous and liquid reactants, catalyst, and polymer particles in the polymerization reactor is in the range from 1 to about 6 hours, alternatively in the range from 1.5 to about 4 hours.

In some embodiments, the process has a lower level of electrostatic charges observed in the gas-phase polymerization reactor. In some embodiments, the polyethylene powder has a lower level of fines. In some embodiments, the polyethylenes have good organoleptic properties.

In some embodiments, the process prepares polyethylenes having a relatively high molecular weight. In some embodiments, the polyethylenes have a $MFR_{21.6}$ at a temperature of 190° C. under a load of 21.6 kg, determined according to DIN EN ISO 1133:2005, condition G, of from 0.1 to 100 g/10 min, alternatively of from 1 to 20 g/10 min, alternatively of from 1.2 to 12 g/10 min. In some embodiments, the ratio of $MFR_{21.6}$ and $MFR_5$, determined according to DIN EN ISO 1133:2005, condition T, at a temperature of 190° C. under a load of 5 kg, is from 10 to 40, alternatively from 12 to 30, alternatively from 15 to 25.

In some embodiments, the polyethylenes have a density according to DIN EN ISO 1183-1:2004, Method A at 23° C. in the range of from 0.918 $g/cm^3$ to 0.970 $g/cm^3$, alternatively in the range of from 0.935 $g/cm^3$ to 0.968 $g/cm^3$, alternatively in the range of from 0.940 $g/cm^3$ to 0.960 $g/cm^3$.

In some embodiments, the polyethylenes have a content of vinyl groups/1000 carbon atoms, determined by means of IR in accordance with ASTM D 6248 98, of not more than 1.2, alternatively a content of vinyl groups/1000 carbon atoms in the range from 0.5 to 1.0.

In some embodiments, the polyethylenes are characterized by a low level of polymer gels. In some embodiments, the number of gels, determined by preparing a 50 μm cast film, analyzing the film defects by an optical scanning device and classifying and counting the film defects according to their size, is not more than $1000/m^2$, alternatively not more than $800/m^2$, alternatively not more than $500/m^2$.

In some embodiments, the polyethylenes are characterized by a low content of catalyst residues. In some embodiments, the ash content of the obtained polyethylene, determined according to DIN EN ISO 3451-1:2008-11, is not more than 250 ppm, alternatively not more than 200 ppm, alternatively not more than 150 ppm.

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

EXAMPLES

The electrostatic charges present in the fluidized-bed reactor were measured by a sensor (Correstat 3410; Progression, Inc., Haverhill, Mass., USA), which monitored charge activity and polarity within the reactor. The sensor had a measurement range from +/−0 to 0.1 nA full scale. For the evaluation of the electrostatic charges inside the reactor, the difference between measured negative and positive charges was chosen. The maximum difference was 0.2 nA and defined as 100% scale whereas no variation in the electrostatic charge was referred to as 0% scale.

The operability was classified according to the four categories:
  Very bad operability: Large fluctuations of reactor skin temperatures which was a sign of polymer layers growing at reactor walls. The formation of sheets and chunks lead to a shut down within 3 hours.
  Bad operability: Some fluctuations of reactor skin temperatures which was a sign of some polymer layers growing at reactor walls. The formation of sheets and chunks lead to a shut down within 24 hours.
  Good operability: Stable reactor behavior with minor fluctuations in terms of reactor skin temperatures. No chunk formation.
  Excellent operability: Stable reactor behavior without fluctuations.

The melt flow rate $MFR_{21.6}$ was determined according to DIN EN ISO 1133:2005, condition G at a temperature of 190° C. under a load of 21.6 kg.

The density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The number of gels was determined by preparing a 50 μm cast film, analyzing the film defects by an optical scanning device and classifying and counting the film defects according to size (circle diameter). The films were prepared by an extruder (type ME20) equipped with a chill roll and winder, model CR-9, and analyzed by an optical film surface analyzer with flash camera system, model FTA100 (components were produced by OCS Optical Control Systems GmbH, Witten, Germany). The apparatus had the following characteristics
  screw diameter: 20 mm;
  screw length: 25 D;
  compression ratio: 3:1;
  screw layout 25 D: 10 D feeding, 3 D compression, 12 D metering;
  dimensions: 1360×650×1778 $mm^3$ (L×W×H; without die);
  die width (slit die): 150 mm;
  resolution: 26 μm×26 μm;
and was operated under the following conditions
  T 1 230° C.;
  T 2 230° C.;
  T 3 230° C.;
  T 4 (adapter) 230° C.;
  T 5 (die) 230° C.;
  die slit die 150 mm;
  take off speed 3.0 m/min;
  screw speed to be adjusted to film thickness 50 μm;
  throughput 1.0 to 1.5 kg/h (target 1.15 kg/h);
  air shower on—5 $m^3$/h,
  chill roll temperature 50° C.;
  vab chill roll 4 N;
  winding tensile force 4 N,
  draw off strength 5 N;
  camera threshold threshold 1: 75%—threshold 2: 65%.

For starting the measurement, extruder and take off unit were set to the specified conditions and started with a material having a pre-determined gel level. The film inspection software was started when the extruder showed steady conditions of temperature and melt pressure. After having operated the extruder with the starting material for at least half an hour or after the gel count having reached the pre-determined gel level, the first sample to measure was fed to the extruder. After having reached a stable gel level for 45 minutes the counting process was started until the camera had inspected an area of at least 3 m² of film. Thereafter the next sample was fed to the extruder and after having reached again a stable gel count for 45 minutes the counting process for the next sample was started. The counting process was set for samples such that the camera inspected an area of at least 3 m² of film and the number of measured defects per size-class was normalized to 1 m² of film.

Example 1

Preparation of Phillips-Type Catalyst

A Phillips-type catalyst was prepared as described in Example 1 of Patent Cooperation Treaty Publication No. WO 99/29736 A1, incorporated herein by reference except that an amount of $Cr(NO_3)_3 9H_2O$ solution was used to provide an intermediate containing 0.3 wt. % of chromium and that the chromium-doped support was activated at 560° C.

Example 2

Polymerization

A high-density polyethylene was prepared using the catalyst obtained in Example 1. The polymerization was carried out in a stainless steel fluidized bed reactor having an internal diameter of 500 mm equipped with a gas circulation system, cyclone, heat exchanger, control systems for temperature and pressure and feeding lines for ethylene, 1-hexene, nitrogen and n-hexane. The reactor pressure was controlled to be 2.2 MPa. The feeding of the various compounds was controlled to obtain a reactor gas composition of 55 vol. % ethylene, 3 vol. % n-hexane and 0.15 vol. % 1-hexene with the remainder being nitrogen, based upon the total volume of the reactor gas.

The catalyst was injected in a discontinuous way by a dosing valve with nitrogen. In addition, triisobutylaluminum (TIBA; obtained from Chemtura Organometallics GmbH, Bergkamen, Germany) was added to the reactor in an amount that the $MFR_{21.6}$ of the prepared high-density polyethylene was 6 g/10 min, resulting in a feeding of 6 ppm per weight TIBA referring to the weight of the prepared polyolefin. The reactor was operated under conditions that the reactor gas returned to the reactor through the cycle gas line was partly condensed and the amount of liquid in the rector gas was 5 wt. %.

The operability was good with minor fluctuations in terms of reactor skin temperatures. No chunks were discharged from the reactor. The reaction conditions in the polymerization reactor and the properties of the obtained polyethylene are reported in Table 1.

Example 3

The polymerization of Example 2 was repeated, except that trihexylaluminum (THA; obtained from Chemtura Organometallics GmbH, Bergkamen, Germany) was added in an amount that the $MFR_{21.6}$ of the prepared high-density polyethylene was about 6 g/10 min, resulting in a feeding of 10 ppm per weight THA referring to the weight of the prepared polyolefin.

The operability was excellent. The detailed reaction conditions in the polymerization reactor and the properties of the obtained polyethylene are reported in Table 1.

Comparative Example A

The polymerization of Example 2 was repeated, except that the reactor was operated under conditions that the reactor gas returned to the reactor through the cycle gas line was not partly condensed.

The operability was good with small fluctuations in terms of reactor skin temperatures. No chunks were discharged from the reactor. The detailed reaction conditions in the polymerization reactor and the properties of the obtained polyethylene are reported in Table 1.

Comparative Example B

The polymerization of Example 2 was repeated, except that the polymerization temperature was lowered to 98° C. and the amount of added trihexylaluminum was reduced so that the $MFR_{21.6}$ of the prepared high-density polyethylene was about 6 g/10 min, resulting in a feeding of 0.2 ppm per weight THA referring to the weight of the prepared polyolefin.

Because of very bad operability with very high electrostatic charges and high entrainment of fines to the cyclone, the fluidized reactor had to be shut down after 3 hours of operation. The detailed reaction conditions in the polymerization reactor and the properties of the obtained polyethylene are reported in Table 1.

Comparative Example C

The polymerization of Example 2 was repeated, except that triethylaluminum (TEAL, obtained from Chemtura Organometallics GmbH, Bergkamen, Germany) was added in an amount that the $MFR_{21.6}$ of the prepared high-density polyethylene was about 6 g/10 min, resulting in a feeding of 3 ppm per weight TEAL referring to the weight of the prepared polyolefin.

Because of bad operability with rather high electrostatic charges and high entrainment of fines to the cyclone, the fluidized reactor had to be shut down after 24 hours of operation. The detailed reaction conditions in the polymerization reactor and the properties of the obtained polyethylene are reported in Table 1.

TABLE 1

|  | Example 2 | Example 3 | Comparative Example A | Comparative Example B | Comparative Example C |
|---|---|---|---|---|---|
| Reactor temperature [° C.] | 115 | 115 | 115 | 98 | 115 |
| Reactor pressure [MPa] | 2.2 | 2.2 | 2.2 | 2.2 | 2.2 |

TABLE 1-continued

|  | Example 2 | Example 3 | Comparative Example A | Comparative Example B | Comparative Example C |
|---|---|---|---|---|---|
| Level of condensing [wt. %] | 5 | 5 | 0 | 5 | 5 |
| Alkyl | TIBA | THA | THA | THA | TEAL |
| Alkyl molar mass [g/mol] | 198 | 282 | 282 | 282 | 114 |
| Alkyl concentration [ppm by wt.] | 6 | 10 | 10 | 0.2 | 3 |
| Mole alkyl per ton of ethylene | 0.0303 | 0.0355 | 0.0355 | 0.0007 | 0.0263 |
| Operability | good | excellent | good | very bad | bad |
| Static charges [%] | 30 | 20 | 60 | 100 | 70 |
| Fines from cyclone [g/3h] | 900 | 500 | 650 | 4000 | 1750 |
| Production rate [kg/h] | 202 | 201 | 181 | 173 | 202 |
| Residence time [h] | 2.0 | 2.0 | 2.0 | 2.0 | 2.0 |
| superficial velocity [m/s] | 0.35 | 0.35 | 0.45 | 0.35 | 0.35 |
| MFR$_{21.6}$ [g/10 min] | 6.0 | 6.4 | 6.1 | 5.7 | 6.3 |
| Density [g/cm$^3$] | 0.945 | 0.945 | 0.945 | 0.945 | 0.945 |
| Number of gels [1/m$^2$] | 455 | 298 | 305 | — | — |

The invention claimed is:

1. A process for the preparation of an ethylene polymer comprising the step of:

polymerizing ethylene or copolymerizing ethylene and one or more other olefins in the presence of a Phillips-type chromium catalyst in a gas-phase polymerization reactor containing a reactor bed of particulate polymer, wherein the gas-phase polymerization reactor is equipped with a cycle gas line for (a) withdrawing reactor gas from the reactor, (b) leading the reactor gas through a heat-exchanger for cooling and (c) feeding the reactor gas back to the reactor, wherein (i) the reactor gas returned to the polymerization reactor through the cycle gas line has been condensed in part, (ii) the amount of liquid in the reactor gas returned to the polymerization reactor is from 0.5 wt. % to 10 wt. % based upon the total weight of the reactor gas/liquid composition, (iii) the polymerization is carried out at a temperature from 108° C. to 125° C., and (iv) an aluminum alkyl of formula AlR$_3$ or of formula AlR$_n$R'$_m$, in which R is a C$_4$-C$_{12}$-alkyl, R' is a C$_4$-C$_{24}$-alkanediyl group which is bridging two aluminum atoms, and n+m=3, is fed into the polymerization reactor in an amount in the range of from 0.0025 mole to 0.1 mole per ton of dosed ethylene.

2. The process according to claim 1, wherein the ethylene polymerization is an ethylene copolymerization of ethylene and 1-butene or an ethylene copolymerization of ethylene and 1-hexene.

3. The process according to claim 1, wherein the aluminum alkyl is trihexylaluminum.

4. The process according to claim 1, wherein the aluminum alkyl is fed to the reactor bed or to the cycle gas line.

5. The process according to claim 1, wherein the polymerization is carried out in the presence of an antistatic agent.

6. The process according to claim 5, wherein the antistatic agent is a mixture comprising an oil-soluble surfactant, water, optionally an alcohol, and one or more aliphatic hydrocarbons.

7. The process according to claim 6, wherein first a mixture of the oil-soluble surfactant, the water, optionally the alcohol, and one or more aliphatic hydrocarbons is prepared and then the mixture is introduced into the polymerization reactor.

8. The process according to claim 1, wherein the reactor gas comprises one or more C$_4$-C$_6$ alkanes.

9. The process according to claim 8, wherein the content of C$_4$-C$_6$ alkanes in the reactor gas is from 1 vol. % to 10 vol. % based upon the total volume of the reactor gas.

10. The process according to claim 1, wherein the Phillips-type chromium catalyst has been activated at a temperature of from 350° C. to 1000° C.

11. The process according to claim 1, wherein the ethylene polymer has a density determined according to DIN EN ISO 1183-1:2004, Method A at 23° C. of from 0.918 g/cm$^3$ to 0.970 g/cm$^3$.

12. The process according to claim 1, wherein the ethylene polymer has a melt flow rate MFR$_{21}$ determined according to DIN EN ISO 1133:2005 at a temperature of 190° C. under a load of 21.6 kg from 0.1 g/10 min to 100 g/10 min.

13. A process for the preparation of an ethylene polymer comprising polymerizing ethylene or copolymerizing ethylene and one or more other olefins in the presence of a Phillips-type chromium catalyst in a gas-phase polymerization reactor containing a reactor bed of particulate polymer, which gas-phase polymerization reactor is equipped with a cycle gas line for withdrawing reactor gas from the reactor, leading the reactor gas through a heat-exchanger for cooling and feeding the reactor gas back to the reactor, wherein the reactor gas comprises one or more C$_4$-C$_6$ alkanes and the reactor gas returned to the polymerization reactor through the cycle gas line has been partly condensed and the amount of liquid in the reactor gas returned to the polymerization reactor is from 0.5 wt. % to 10 wt. %, the polymerization is carried out at a temperature from 108° C. to 125° C., and an aluminum alkyl of formula AlR$_3$ or of formula AlR$_n$R'$_m$, in which R is a C$_4$-C$_{12}$-alkyl, R' is a C$_4$-C$_{24}$-alkanediyl group which is bridging two aluminum atoms, and n+m=3, is fed into the polymerization reactor in an amount in the range of from 0.0025 mole to 0.1 mole per ton of dosed ethylene.

14. The process of claim 13, wherein the content of C$_4$-C$_6$ alkanes in the reactor gas is from 1 vol. % to 10 vol. %.

15. The process of claim 13, wherein the Phillips-type chromium catalyst has been activated at a temperature of from 350° C. to 1000° C.

16. The process of claim 13, wherein the ethylene polymer has a density determined according to DIN EN ISO 1183-1:2004, Method A at 23° C. of from 0.918 g/cm$^3$ to 0.970 g/cm$^3$.

17. The process of claim 13, wherein the ethylene polymer has a melt flow rate MFR$_{21}$ determined according to DIN EN ISO 1133:2005 at a temperature of 190° C. under a load of 21.6 kg from 0.1 g/10 min to 100 g/10 min.

18. The process of claim 13, wherein the polymerization is carried out in the presence of an antistatic agent.

19. The process of claim 18, wherein the antistatic agent is a mixture comprising an oil-soluble surfactant, water, optionally an alcohol, and one or more aliphatic hydrocarbons.

20. A process for the preparation of an ethylene polymer having a density, determined according to DIN EN ISO 1183-1:2004, Method A at 23° C. of from 0.918 g/cm$^3$ to 0.970 g/cm$^3$ and a melt flow rate MFR$_{21}$ determined according to DIN EN ISO 1133:2005 at a temperature of 190° C. under a load of 21.6 kg from 0.1 g/10 min to 100 g/10 min, comprising polymerizing ethylene or copolymerizing ethylene and one or more other olefins in the presence of a Phillips-type chromium catalyst and an antistatic agent in a gas-phase polymerization reactor containing a reactor bed of particulate polymer, which gas-phase polymerization reactor is equipped with a cycle gas line for withdrawing reactor gas from the reactor, leading the reactor gas through a heat-exchanger for cooling and feeding the reactor gas back to the reactor, wherein the reactor gas comprises one or more $C_4$-$C_6$ alkanes in a content from 1 vol. % to 10 vol. % and the reactor gas returned to the polymerization reactor through the cycle gas line has been partly condensed and the amount of liquid in the reactor gas returned to the polymerization reactor is from 0.5 wt. % to 10 wt. %, the polymerization is carried out at a temperature from 108° C. to 125° C., and an aluminum alkyl of formula AlR$_3$ or of formula AlR$_n$R'$_m$, in which R is a $C_4$-$C_{12}$-alkyl, R' is a $C_4$-$C_{24}$-alkanediyl group which is bridging two aluminum atoms, and n+m=3, is fed into the polymerization reactor in an amount in the range of from 0.0025 mole to 0.1 mole per ton of dosed ethylene.

* * * * *

UNITED STATES PATENT AND TRADEMARK OFFICE
CERTIFICATE OF CORRECTION

PATENT NO. : 10,202,472 B1
APPLICATION NO. : 16/079229
DATED : February 12, 2019
INVENTOR(S) : Meier et al.

It is certified that error appears in the above-identified patent and that said Letters Patent is hereby corrected as shown below:

In the Specification

In Column 2, Line 6, delete "C4-C6" and insert -- $C_4$-$C_6$ --

In Column 2, Line 15, delete "0.918 g/cm3" and insert -- 0.918 $g/cm^3$ --

In Column 2, Line 15, delete "0.970 g/cm3." and insert -- 0.970 $g/cm^3$. --

In Column 2, Line 17, delete "MFR21" and insert -- $MFR_{21}$ --

In Column 9, Line 56, delete "rector" and insert -- reactor --

Signed and Sealed this
Fifth Day of July, 2022

Katherine Kelly Vidal
*Director of the United States Patent and Trademark Office*